(12) United States Patent
Benkler

(10) Patent No.: US 6,918,462 B2
(45) Date of Patent: Jul. 19, 2005

(54) FASTENING ARRANGEMENT FOR AN UPHOLSTERY PART COVERING A VEHICLE LOUDSPEAKER

(75) Inventor: Olaf Benkler, Neuhausen/Hamberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 224 days.

(21) Appl. No.: 10/358,259

(22) Filed: Feb. 5, 2003

(65) Prior Publication Data
US 2003/0146042 A1 Aug. 7, 2003

(30) Foreign Application Priority Data
Feb. 5, 2002 (DE) .......................... 102 04 604

(51) Int. Cl.⁷ ................................ H05K 5/00
(52) U.S. Cl. ..................... 181/150; 181/148
(58) Field of Search ................ 181/150, 149, 181/152, 153–157, 151

(56) References Cited

U.S. PATENT DOCUMENTS 4,550,796 A * 11/1985 Tomita ................ 181/141
4,712,246 A * 12/1987 Morrison .............. 381/77
4,993,510 A    2/1991 Kato et al.
5,920,039 A * 7/1999 Cote et al. ............ 181/141

FOREIGN PATENT DOCUMENTS

| DE | 29 20 836 | 5/1979 |
| DE | 37 06 918 A1 | 3/1987 |
| EP | 0769420 | 4/1997 |
| JP | 07251686 | 10/1995 |
| JP | 2001347896 | 12/2001 |
| WO | 00/69687 | 11/2000 |

* cited by examiner

Primary Examiner—Kimberly Lockett
(74) Attorney, Agent, or Firm—Crowell & Moring LLP

(57) ABSTRACT

An arrangement fastens a loudspeaker covered by a loudspeaker screen to a covering part of a vehicle. The covering part has a recess adjacent to the loudspeaker. The loudspeaker screen and a holding part are mutually connected by fastening screws, and are locally supported on opposite sides of the covering part. Several mutually spaced domes are arranged on and projecting away from the loudspeaker screen to penetrate openings constructed at the covering part. Either the holding part or the loudspeaker is fitted onto the free end of each dome projecting over the covering part and being held in position thereon by a screwed-in fastening screw.

10 Claims, 4 Drawing Sheets

US 6,918,462 B2

FASTENING ARRANGEMENT FOR AN UPHOLSTERY PART COVERING A VEHICLE LOUDSPEAKER

BACKGROUND OF THE INVENTION

The present invention relates to an arrangement for fastening a loudspeaker covered by a loudspeaker screen to a covering part of a vehicle, the covering part having a recess adjacent to the loudspeaker, the loudspeaker screen and a holding part being mutually connected by fastening screws and being locally supported on opposite sides of the covering part.

U.S. Pat. No. 4,993,510 shows a loudspeaker fastening in which the loudspeaker is fastened directly to the interior side of the loudspeaker screen and the loudspeaker screen is tensioned by a holding part against the covering part. This arrangement has the disadvantage that, because of the installation depth of the loudspeaker, the loudspeaker screen projects relatively far into the vehicle occupant compartment. Furthermore, when a defective loudspeaker is exchanged, the loudspeaker screen as well as the holding part have to be demounted from the covering part.

SUMMARY OF THE INVENTION

An object of the present invention is to provide an improved arrangement for fastening a loudspeaker to a covering part on a vehicle such that the loudspeaker screen projects only minimally into the vehicle occupant compartment and that the exchange of a defective loudspeaker can take place as easily as possible without demounting the loudspeaker screen and the holding part.

According to the invention, this object is achieved by mutually space domes arranged on the loudspeaker screen which project away from the loudspeaker screen and which penetrate openings constructed at the covering part, either the holding part or the loudspeaker being fitted onto the free end of each dome projecting over the covering part and being held in position thereon by a screwed-in fastening screw.

Principal among the advantages achieved with the present invention are that, because of the flat loudspeaker screen with molded-on domes and the holding part accommodating a loudspeaker, a loudspeaker fastening is provided which projects only insignificantly into the vehicle occupant compartment. Thereby, a simple unproblematic loudspeaker exchange is permitted without any demounting of the loudspeaker and the holding part. The loudspeaker screen and the holding part represent cost-effective components which are easy to produce. The complete loudspeaker arrangement can be mounted in a simple manner. For demounting the loudspeaker, only two fastening screws have to be removed, while the loudspeaker screen and the holding part remain on the covering part.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
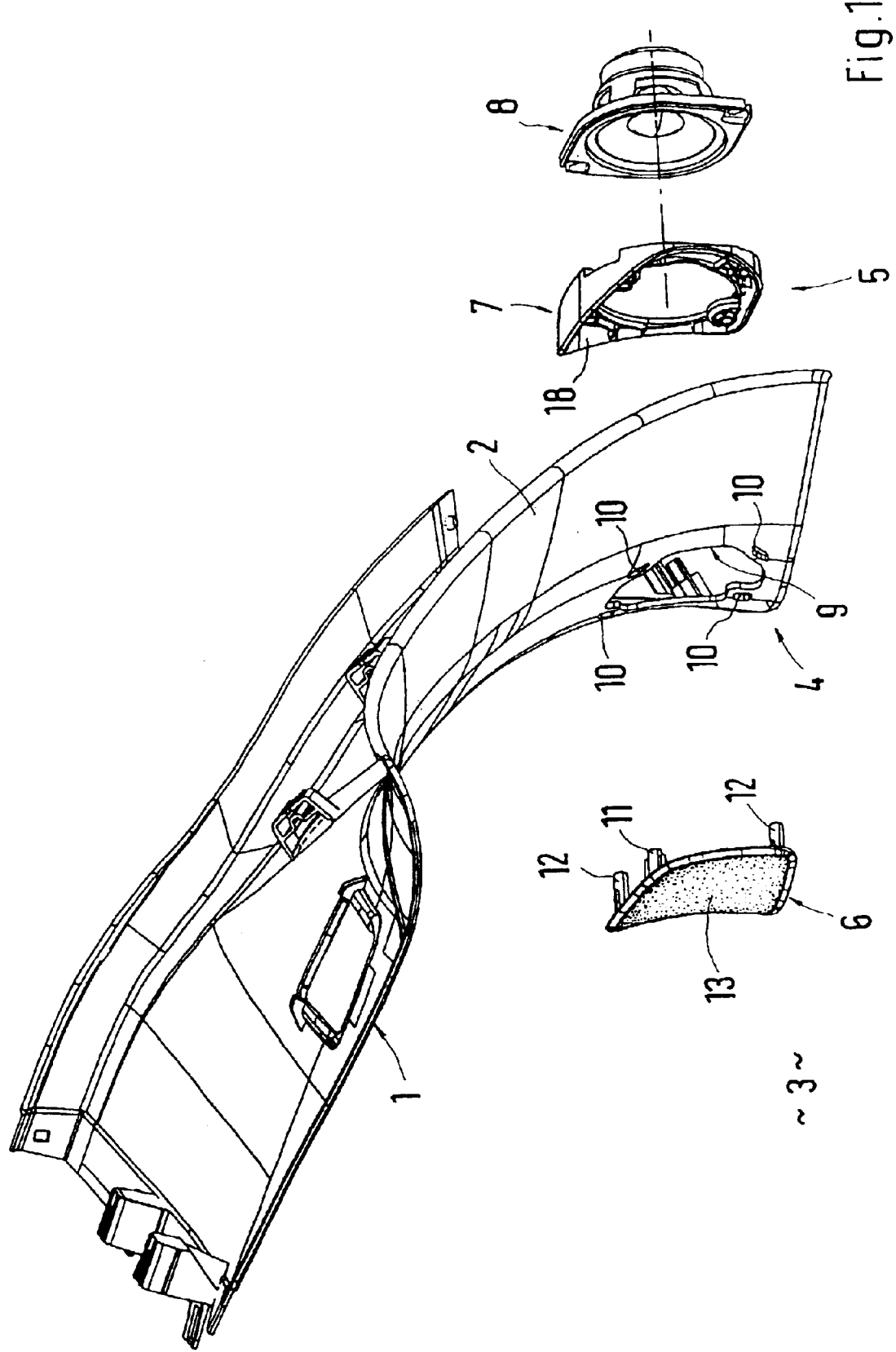
FIG. 1 is an exploded front perspective view of the covering part of the loudspeaker screen, of the holding part and of the loudspeaker in accordance with the present invention.

FIG. 1 shows a covering part 1 arranged in the vehicle occupant compartment 3 of a vehicle (not shown in detail). The covering part 1 is formed by an upright column covering 2 in the illustrated embodiment. The covering part 1 is produced, for example, as an injection-molded part from a suitable plastic material and, on the side facing the vehicle occupant compartment, can have a grain or a decorative covering. The fastening of the covering part 1 to the adjoining vehicle body (also not shown in detail) takes place in a conventional manner by clipping, screwing, or the like.

In a lower area 4 of the covering part 1, a loudspeaker arrangement 5 is provided which is composed of a loudspeaker screen 6, a holding part 7 and a loudspeaker 8. On the covering part 1, a central recess 9 is constructed which is disposed in front of the loudspeaker 8 and is used as the sound transmission opening.

For fastening the loudspeaker arrangement 5 to the covering part 1, specifically outside as well as adjacent to the recess 9, several openings 10 are provided through which the molded-on projecting domes 11, 12 of the loudspeaker screen 6 are guided. The domes 11, 12 protrude over the covering part 1 in areas toward the rear. The loudspeaker screen 6, which projects on all sides over the recess 9 on the covering part 1, is placed from the front onto the side of the covering part 1 facing the vehicle occupant compartment 3 and has, at least in selected areas, a grid-shaped structure with an outer surrounding closed frame as seen in FIG. 1.

Figure 5:
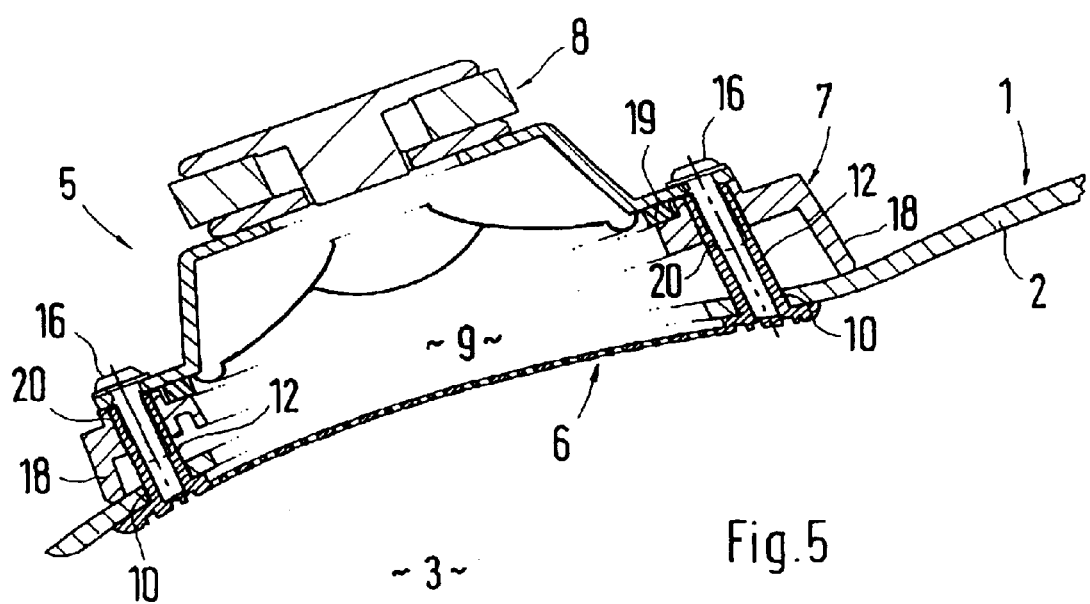
FIG. 5 is a sectional view along line V—V of FIG. 3, which illustrates the fastening of the loudspeaker on the holding part.

In the direction of the vehicle occupant compartment 3, the loudspeaker screen 6 has a flat construction. The injection-molded-on domes 11, 12 are aligned approximately at a right angle with respect to the surface 13 of the loudspeaker screen 6 visible from the vehicle occupant compartment 3 and are constructed as hollow cylinders 20 (FIG. 5). The hollow cylinders 20 are closed toward the vehicle occupant compartment 3.

Figure 4:
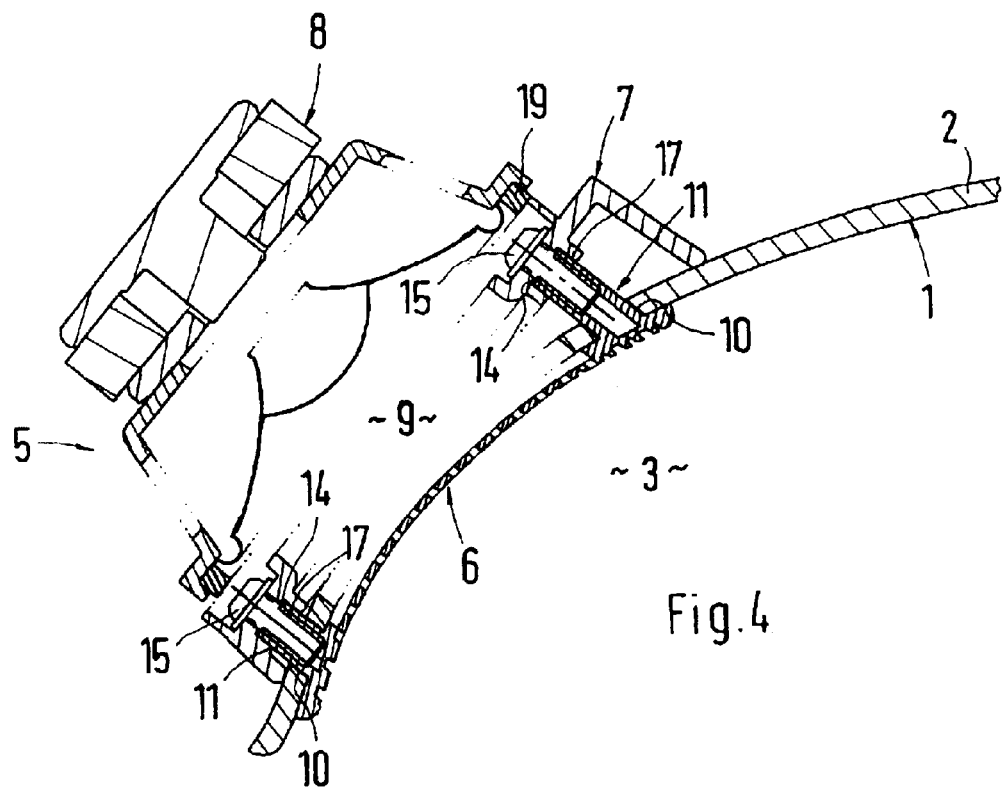
FIG. 4 is a sectional view along line IV—IV of FIG. 3, in which the fastening is shown between the loudspeaker screen and the holding part.

From the side of the covering part 1 situated opposite the loudspeaker screen 6, the holding part 7 is fitted onto the free ends 14 of the domes 11 and is fastened to the domes 11 by fastening screws 15 (FIG. 4). Furthermore, the loudspeaker 8 is placed onto the ring-shaped holding part 7 and is held in position on the domes 12 of the loudspeaker screen 6 by fastening screws 16 (FIG. 5).

Figure 3:
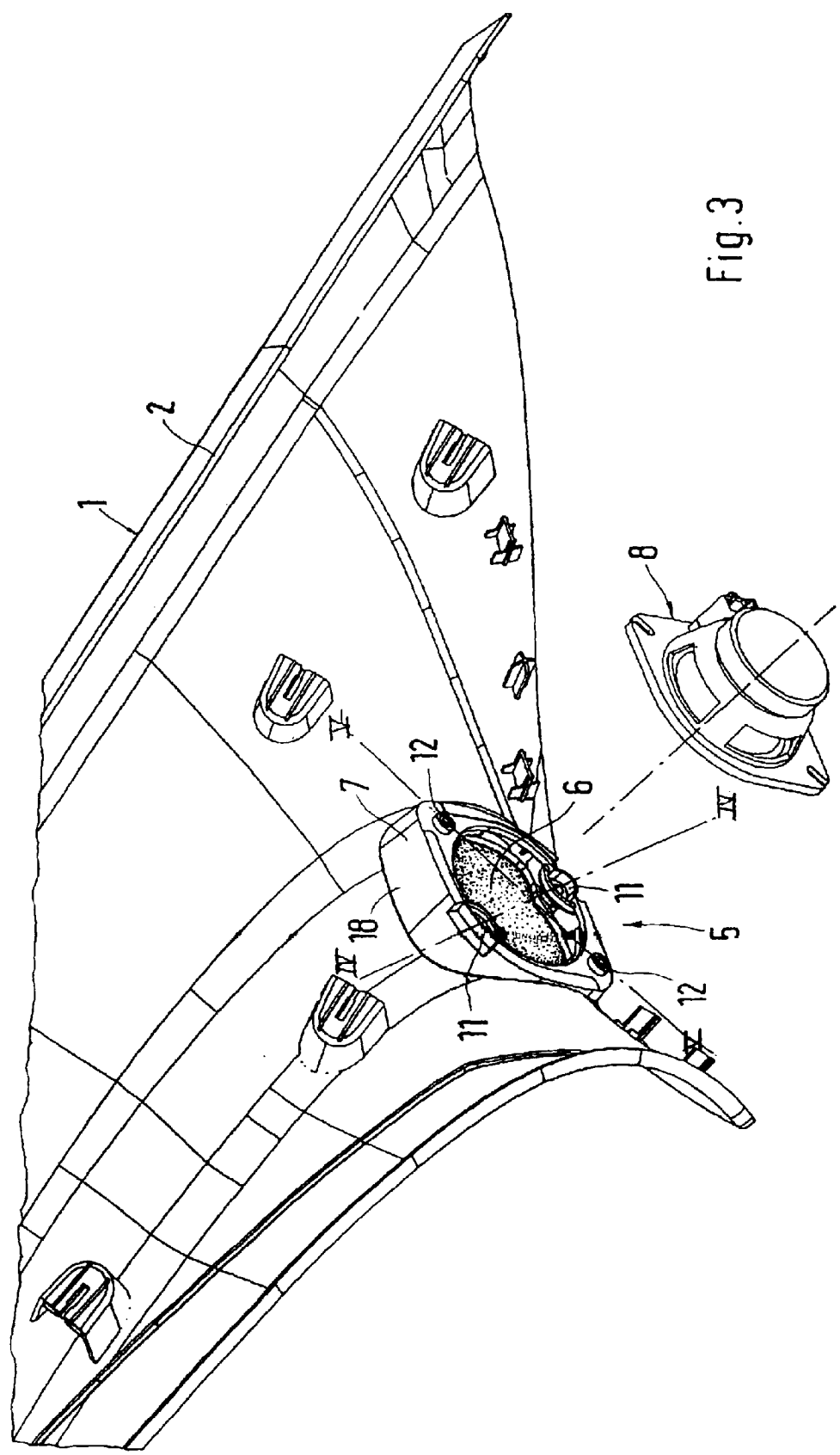
FIG. 3 is yet another exploded view of the covering part shown in FIG. 1, but from the rear, with the mounted loudspeaker screen, the fitted-on holding part and the not yet mounted loudspeaker.

At least two domes 11 for the connection with the holding part 7 and additionally at least two domes 12 for the fastening of the loudspeaker 8 are preferably provided on the loudspeaker screen 6. The two domes 11, 12 which are in each case assigned to one another are constructed in a diagonally opposite manner on the loudspeaker screen 6 (FIG. 3). More or fewer than two domes for the connection with the holding part 7 or for fastening the loudspeaker may, however, also be provided on the loudspeaker screen 6 as contemplated by the present invention.

Figure 2:
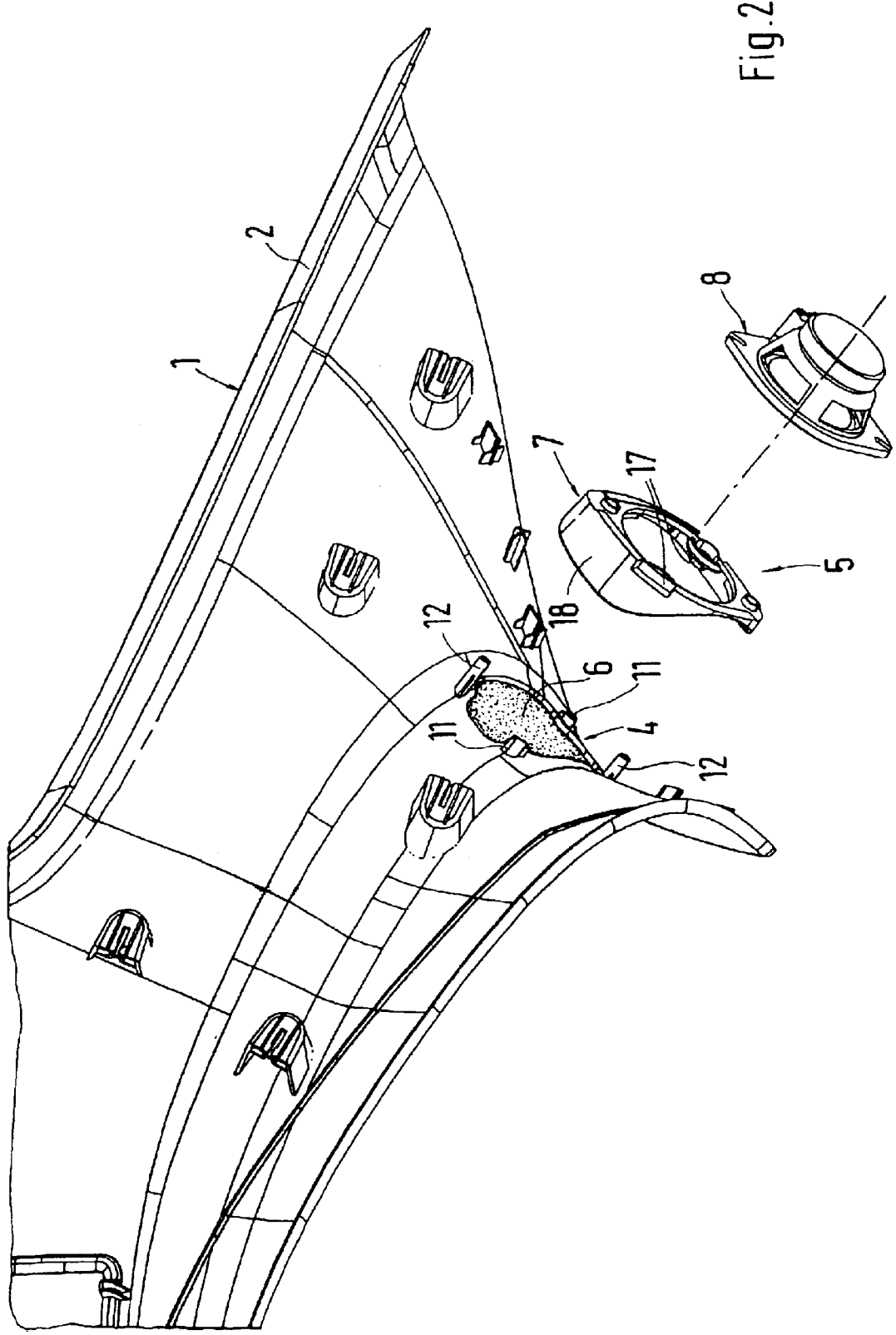
FIG. 2 is another exploded perspective view of the covering part, but from the rear, with a fitted-on loudspeaker screen, of the holding part and of the loudspeaker shown in FIG. 1.

The holding part 7 is correctly positioned by way of locally pot-shaped receiving devices 17 (FIG. 2) which reach around the free ends 14 of the assigned domes 11 in sections (see also FIG. 4). Furthermore, the ring-shaped holding part 7 is supported by a surrounding outer web 18 on the back side of the covering part 1, specifically outside the recess 9. The web 18 has a varying height along its longitudinal course.

A surrounding sealing body 19 allows the placement of the loudspeaker 8 on the exterior face of the holding part 7. The loudspeaker 8 is held in position by the fastening screws 16. The fastening screws 15, 16 for the loudspeaker 8 and the holding part 7 respectively are mounted from the side of the covering part 1 facing away from the vehicle occupant compartment 3. Specifically, the fastening screws 15, 16 are screwed into the hollow cylinders 20 of the domes 11, 12. The hollow cylinders 20 of the domes 11 and 12, respectively, may either have an internal thread or thread-forming fastening screws 15, 16 are used which are screwed into hollow cylinders 20 constructed without threads.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein the domes for the connection with the holding part and at least two additional domes for fastening the loudspeaker are constructed on the loudspeaker screen which has a substantially flat surface.

2. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein domes for the connection with the holding part and the domes for fastening the loudspeaker are respectively arranged in a diagonally opposite each other on the loudspeaker screen.

3. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein the domes for the connection with the holding part and at least two additional domes for fastening the loudspeaker are molded on in one piece with the loudspeaker screen which has a substantially flat surface.

4. The fastening arrangement according to claim 3, wherein domes for the connection with the holding part and the domes for fastening the loudspeaker are respectively arranged in a diagonally opposite each other on the loudspeaker screen.

5. The fastening arrangement according to claim 1, wherein the loudspeaker screen is an injection-molded plastic part.

6. The fastening arrangement according to claim 1, wherein the openings on the covering part are provided outside of and adjacent to a central recess.

7. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein, for correct positioning of the holding part, locally pot-shaped receiving devices are constructed thereon, which, at least in selected sections thereof, reach around free ends of the associated domes of the loudspeaker screen.

8. A fastening arrangement comprising a loudspeaker, a loudspeaker screen covering the loudspeaker, and a vehicle covering part, the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein the holding part rests on at least two oppositely arranged ones of the domes of the loudspeaker screen and is supported by a surrounding edge-side web on an interior side of the covering part.

9. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein the loudspeaker is arranged to rest in a fastening area thereof on a face of free ends of the domes and is tensioned by the fastenings against the domes or the holding part, with a surrounding sealing body being connected between the loudspeaker and the holding part.

10. A fastening arrangement comprising a loudspeaker, a loudspeaker screen covering the loudspeaker, and a vehicle covering part, with the vehicle covering part having a recess adjacent to the loudspeaker, and the loudspeaker screen and a holding part being mutually connected by fastening screws and being locally supported on opposite sides of the vehicle covering part, wherein a plurality of mutually spaced domes are operatively arranged on the loudspeaker screen to project away therefrom and to penetrate openings constructed at the covering part, whereby the holding part or the loudspeaker is fittable onto a free end of each of the domes projecting over the covering part and is holdable in position thereon by screwed-in fastenings, wherein the domes are injection-molded-on hollow cylinders which are closed toward a vehicle occupant compartment, with the fastenings being screwed into the hollow cylinders from a back side thereof.

\* \* \* \* \*